United States Patent

Blackwell, Jr.

[15] 3,642,214
[45] Feb. 15, 1972

[54] CUTTER TOOTH ASSEMBLY FOR GRINDER

[72] Inventor: George T. Blackwell, Jr., P.O. Box 278, Oneonta, Ala. 35121

[22] Filed: Jan. 19, 1970

[21] Appl. No.: 3,984

[52] U.S. Cl..............................................241/191, 241/197
[51] Int. Cl.....................................B02c 13/06, B02c 13/28
[58] Field of Search......................241/86, 88, 189, 190, 191, 241/195, 197, 291, 294, 298, 300; 146/305, 308

[56] References Cited

UNITED STATES PATENTS

| | | | |
|---|---|---|---|
| 3,378,210 | 4/1968 | Bambach | 241/195 X |
| 858,772 | 7/1907 | Williams | 241/189 |
| 1,301,316 | 4/1919 | Plaisted | 241/195 X |
| 3,473,742 | 10/1969 | Montgomery | 241/191 X |
| 2,869,793 | 1/1959 | Montgomery | 241/197 X |

Primary Examiner—Robert L. Spruill
Attorney—Jones & Thomas

[57] ABSTRACT

The cutter tooth assembly for a rotor of a grinder of the type used for grinding wood, scrap or the like. The grinder comprises a rotor having alternate large and small diameter breaker rings with at least one breaker head protruding from each breaker ring. The cutter tooth assembly comprises a holder having a boss or stem inserted into the leading surface of the breaker head. A small, relatively inexpensive cutting blade is attached to the leading surface of the holder and makes primary contact with the material being ground up in the grinder. The forces exerted on the cutting blade are primarily compressive and urge the cutting blade against the holder and the holder against the breaker head, and the cutting blade defines a sharpened ridge at its outermost edge to form a cutting edge, and the cutting edge is heat hardened.

5 Claims, 3 Drawing Figures

PATENTED FEB 15 1972

3,642,214

INVENTOR
GEORGE T. BLACKWELL, JR

BY Jones & Thomas

ATTORNEYS

CUTTER TOOTH ASSEMBLY FOR GRINDER

BACKGROUND OF THE INVENTION

In the past, various machines have been developed for the purpose of grinding up wood, soft metal, and the debris carried with these and other scrap substances. The machines usually comprise a rotor having a plurality of teeth that pass through relatively small openings formed by anvils or similar hard structures. An object to be ground up is dropped onto the rotor which revolves at a high angular velocity and the teeth gouge away portions of the object and force the material through the openings in the anvil.

While machines of this nature have been in common use for an extended period, the teeth of the rotor are subject to rapid wear and deterioration and must be replaced from time to time. The teeth of the rotor perform virtually all of the grinding of the objects to be ground up and are usually arranged with respect to the rotor so that they encounter virtually all of the compressive and impact forces. The teeth therefore must be extremely strong and are usually large and expensive.

As the teeth of the rotor wear, they become rounded about their edges and less effective in their grinding or cutting function. Thus, it is usually desirable to replace the teeth frequently to attain optimum rotor cutting characteristics for a given power input to the rotor; but the cost of the teeth and the labor costs required to replace the teeth are so excessive that they are not usually replaced with the frequency required to maintain good cutting characteristics from the rotor.

Moreover, the cost of new teeth is such that worn teeth are usually removed from the rotor, transported to a device for sharpening teeth, and transported back to the grinding machine where they are reconnected to the rotor. Obviously, the delay time encountered in the sharpening process is expensive and onerous, and it is necessary to maintain a complete set of sharpened teeth at the site of the grinder to minimize the downtime of the grinder. While some of the grinders are permanently located at the site of the mill, others are portable and used along railroad tracks to grind crossties, etc., or are transported between different mill sites, and it is difficult to maintain a supply of extra cutting teeth with the grinder and to transport the worn cutting teeth to a machine for sharpening the teeth.

SUMMARY OF THE INVENTION

Briefly described, the present invention comprises a cutter tooth assembly for a rotor of a grinding machine of the type used for grinding wood, paper, paperboard and the various types of debris carried by these substances. The grinder includes a rotor having alternate large and small diameter breaker rings and at least one breaker head protruding from each breaker ring. The cutter tooth assembly includes a holder connectable to a breaker head and a relatively small and inexpensive cutting blade fastened to the holder. The cutting blade is positioned by the holder so that it forms the primary cutting and impact surface of the rotor and thus is the portion of the assembly most subject to wear. A worn cutting blade is conveniently and expediently removable from the holder, and can be discarded without any substantial financial loss, and a supply of new cutting blades can be conveniently maintained with the grinder.

Thus, it is an object of this invention to provide a cutter tooth assembly which is inexpensive to manufacture, lasts for a prolonged time in heavy wear conditions, and which has removable portions thereof that are easily replaceable and are inexpensive.

Another object of this invention is to provide a cutting blade for a cutter tooth assembly that is inexpensive, shaped with a cutting edge that withstands high compressive impact forces and substantially retains its shape after prolonged wear.

Other objects, features and advantages of the present invention will become apparent upon reading the following specifications, when taken into conjunction with the accompanying drawing.

DESCRIPTION OF THE PREFERRED EMBODIMENTS

Figure 1:
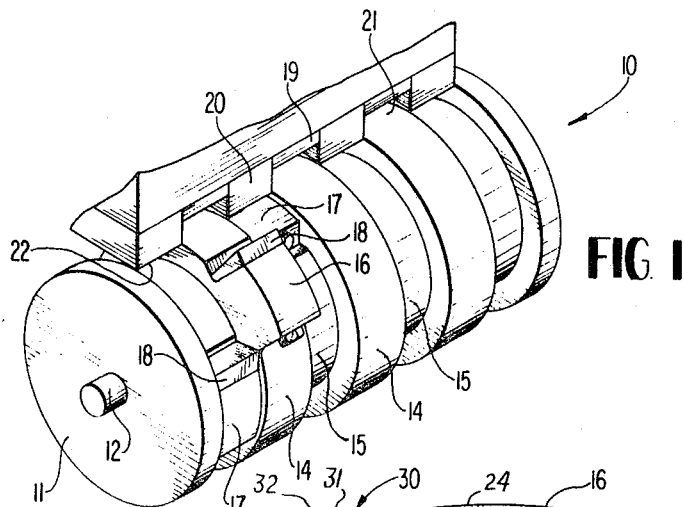
FIG. 1 is a perspective view of a rotor and anvil assembly of a grinder.

Referring now in more detail to the drawing, in which like numerals indicate like parts throughout the several views, FIG. 1 shows grinder 10 that includes rotor 11 rotatable about an axis 12. Rotor 11 comprises a plurality of alternately large and small diameter breaker rings 14 and 15 and each breaker ring 14 and 15 carries at least one breaker head 16 or 17. A tooth assembly 18 is carried by each breaker head 16 or 17. The tooth assemblies and breaker heads are arranged to pass adjacent anvils 19 and 20, with the smaller anvils 19 defining larger spaces 21 for the breaker heads and teeth assemblies 16 and 18 and the larger anvils 20 defining smaller spaces 22 for the passage of the breaker heads 17 and teeth assemblies 18 of smaller diameter breaker rings 15. If desired, smaller diameter breaker ring 15 and its breaker head 17 can be displaced inwardly of the outer periphery of larger diameter breaker ring 14 so that the larger anvils 20 protrude into the spaces between the larger diameter breaker rings 14. This assures that the ground up material is small enough to pass through spaces 21 and 22.

Figure 2:
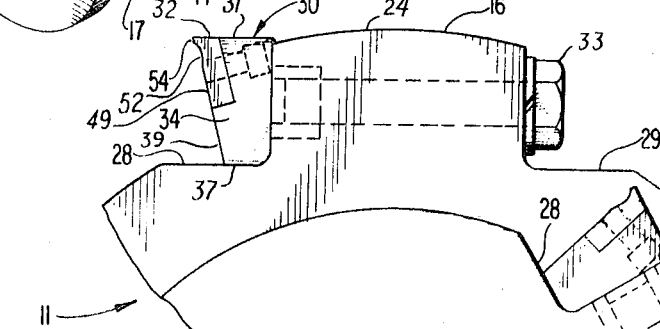
FIG. 2 is a partial side cross-sectional view of the rotor.
Figure 3:
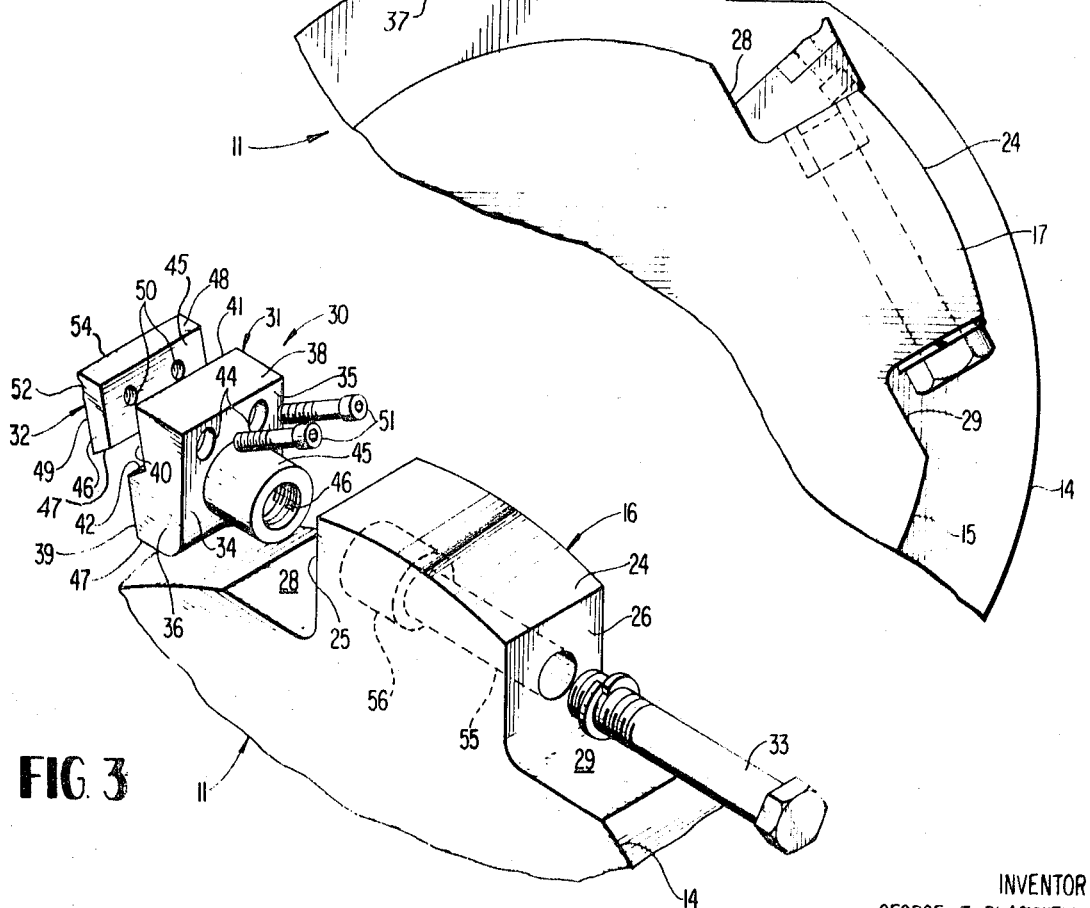
FIG. 3 is a perspective view of one of the breaker rings of the rotor.

As is best shown in FIGS. 2 and 3, breaker heads 16 and 17 protrude radially outwardly from the center of rotor 11 and include rounded outer surface 24, flat leading surface 25, and flat trailing surface 26. To emphasize the shape of each breaker head without requiring the breaker head to extend a large distance from the surface of its breaker ring, each breaker ring is undercut to form recesses 28 and 29 adjacent the leading and trailing surfaces of each breaker head.

Each cutter tooth assembly 30 is fabricated of relatively hard material, preferably a ferrous metal, and is connected to the leading surface of each breaker head 16 or 17 and comprises holder 31, cutting blade or bit 32, and bolt 33. Holder 31 comprises a substantially flat sided support block 34 which includes rear surface 35, side surfaces 36, bottom surface 37, top surface 38, and front surface 39. The junction between rear surface 35 and bottom surface 37 is rounded and corresponds to the rounded junction between leading surface 25 of the breaker head and recess 28. Side surfaces 36, bottom surface 37 and top surface 38 extend substantially perpendicular to rear surface 35. Front surface 39 is substantially flat and slopes away from rear surface 35 from bottom surface 37 toward top surface 38. The angle of the slope between front surface 39 and rear surface 35 is approximately 13° to 15°. Slot 40 is defined in front surface 39 and includes inner surface 41 that is substantially parallel to front surface 39 and ledge surface 42 that is substantially perpendicular to inner surface 41. Slot 40 extends from side surface to side surface of the support block 34 and extends downwardly from top surface 38 toward bottom surface 37. A pair of apertures 44 are defined in support block 34 and extend from rear surface 35 through inner surface 41. Cylindrical boss 45 extends at a right angle from rear surface 35 of the support block. Cylindrical boss 45 defines an internally threaded bore 46 therein.

Cutting blade 32 is sized and shaped to fit slot 40 of support block 34 and comprises rear surface 45, side surfaces 46, bottom surface 47, top surface 48 and front surface 49. Top surface 48 extends at an angle of approximately 105° from rear surface 45. Bottom surface 47 normally abuts ledge 42 of slot 40, and rear surface 45 is normally juxtaposed inner surface 41 of support block 34. The width, height and thickness of cutting blade 32 is gauged so that the cutting blade substantially fills slot 40 and its side surfaces 46 form extensions of side surfaces 36 of support block 34, its front surface 49 forms an extension of the front surface 39 of support block 34, and its top surface 48 forms an extension of top surface 38 of the support block.

A pair of apertures 50 are defined in cutting blade 32 and extend from rear surface 45 through front surface 49 and are placed so as to be in alignment with apertures 44 extending through support block 34. Apertures 50 of cutting blade 32 are internally threaded and bolts 51 extend through apertures 44 from the rear surface 35 of support block 34 and threadably engage the threaded apertures 50 of cutting blade 32. This secures cutting blade 32 in slot 40 of holder 31.

The front surface 49 of cutting blade 32 comprises a shallow rounded groove 52 that extends from side surface to side surface of the cutting blade adjacent its top surface 48, to form cutting ridge 54 at the junction of top surface 48 and front surface 49. Cutting ridge 54 is heat treated so that it is very hard and able to withstand excessive forces and extensive wear before becoming dull. The configuration of cutting ridge 54 is such that even after a portion of its sharpened cutting edge has been worn away, the junction between front surface 49 and top surface 48 still remains relatively sharp since top surface 48 and front surface 49 are disposed at an acute angle of approximately 75° to 77°. Thus, cutting blade 32 maintains an effective cutting shape even after it has been worn away to a substantial extent.

Apertures 44 of holder 31 extend substantially perpendicular to inner surface 41 of slot 40 and are shaped so that they conform to the shape of the shanks and heads of bolts 51. When bolts 51 are inserted through holder 31 and threaded into the threaded apertures 50 of cutting blade 32, their heads will be recessed in the rear surface 35 of holder 31.

Through bore 55 is defined in each breaker head 16 and 17, and a counterbore 56 is defined in the leading surface 25 of each breaker head to form a socket to receive the boss 45 of the holder 31. When a holder 31 has its boss 45 inserted into socket 56, the rear surface 35 of the holder will abut the leading surface 25 of the breaker head, and the bottom surface 37 of the holder will be positioned in the recess 28 of the breaker ring. The bolt 33 is inserted through the bore 55 and threaded into the threaded bore 46 of boss 45 to hold the tooth assembly in juxtaposition against the leading surface 25 of the breaker head.

OPERATION

When a grinder as illustrated in FIG. 1 is operated by the rapid rotation of rotor 11, the material to be ground up is allowed to fall by gravity down into contact with rotor 11. The material will be engaged by cutting blades 32 as the rotor rotates. The cutting ridge 54 of each cutting blade 32 will bite into the material and sever and wedge chunks of the material away from the main body of the material. The tooth assembly passes adjacent anvils 19 and 20 of grinder 10 on each revolution with rotor 11, so that if any particles of the material moving with the tooth assembly happen to be larger than the spaces 21 and 22 between the anvils and the breaker rings 14 and 15, the tooth assembly 30 will break up these particles so that they will pass through the spaces. The side surfaces 46 and top surfaces 48 of the cutting blades function with a scissors motion with the sides of anvils 19 and 20 to sever and grind the material at this point.

Since the sharpened edge 54 at the junction of top surface 48 and front surface 49 of each cutting blade 32 is heat treated and extremely hard, the ridges will last for a prolonged time before they become worn away and dull. Moreover, since the angle between top surface 48 and front surface 49 of each cutting blade 32 is an acute angle of approximately 77°, a relatively sharp edge should always be present at the junction of these surfaces. Furthermore, the shallow rounded groove 52 adjacent top surface 48 of each cutting blade 32 assures that the sharpness of the ridge 54 is emphasized on the new blades, and when the new blades begin to wear away, the sharpness of the ridge is maintained for an extended time due to the depth of rounded groove 52.

The recesses 28 in breaker rings 14 and 15 allow the bottom portion of each holder 31 to be substantially shielded from impact against the material being ground up in grinder 10. Thus, the primary impact will be encountered by cutting blades 32 and the cutting blades will be inclined to wear faster than holder 31 or breaker heads 16 and 17. Thus, the smallest and least expensive part of the assembly is positioned at the critical wear points about the assembly.

When it is desirable to replace worn cutting blades with new cutting blades, bolt 33 extending from the rear surface 26 of the breaker heads is loosened so as to urge its holder 31 away from front surface 25 of the breaker head. In many cases, the bolt 33 does not have to be completely removed from bolt 46 of the tooth assembly and bolts 51 extending through the back of support block 34 of holder 31 can be reached and loosened to remove cutting blade 32. It should be noted that bolts 51 extend through support block 34 at an angle which enables a tool to reach the heads of the bolts without having to move holder 31 a large distance away from its breaker head. Moreover, when bolts 51 have been loosened, cutting blade 32 will fall away from holder 31 and a new cutting blade 32 can be positioned adjacent holder 31 and the bolts 51 tightened again. After bolts 51 have been tightened, bolt 33 can be tightened.

In some situations it is desirable to completely remove holder 31 from its breaker head. In these situations, bolt 33 is merely backed off the holder to be removed and then inserted into the replacement holder, in a rapid operation.

The threads of bolts 51 and the threads of bolts 33 are located so that they are never subject to wear and abrasion by the material being ground up. Moreover, bolts 51 and 33 should encounter virtually no impact forces or shear forces due to the impact of the material against the blades since the forces encountered by cutting blade 32 will be transmitted back through holder 31 to the breaker head. Moreover, the boss and socket arrangement between holder 31 and the breaker head is such that the centrifugal forces felt by the relatively heavy holder 31 will be born primarily through the boss and socket, and not by bolt 33. It should be noted that two bolts 51 are provided to bear centrifugal forces exerted on cutting blades 32 and that the angle of inner faces 41 of holders 31 is such that it bears a substantial amount of the centrifugal forces applied to cutting blades 32 which further minimizes any shear forces felt by bolts 51. In addition, bolts 51 will be trapped between its holder 31 and its breaker head so that there is virtually no chance of one or both of the bolts 51 becoming loosened by the operation of the assembly.

While this invention has been described in detail with particular reference to a preferred embodiment thereof, it will be understood that variations and modifications can be effected with the spirit and scope of the invention as described hereinbefore.

I claim:

1. A cutter tooth assembly for a rotor of a grinder of the type used for grinding wood, scrap, or the like, comprising a holder and a cutting blade, said holder comprising a support block with a substantially flat rear surface having a cylindrical boss extending perpendicularly therefrom, and substantially flat bottom, top and side surfaces extending substantially normal to said rear surface and a substantially flat front surface sloping away from said rear surface from said bottom surface toward said top surface, a flat-sided slot defined in said support block and extending across said front surface from the edges of said sides and top surfaces and defining an inner surface and a ledge surface, and at least one aperture defined in said holder and extending from said rear surface to said inner surface, said cutting blade being sized and shaped to occupy said slot and comprising a rear surface juxtaposed said inner surface, a bottom surface juxtaposed said ledge surface and side, top and front surfaces forming extensions of the side, top and front surfaces of said holder, and at least one aperture defined in said cutting blade and extending from its rear surface to its front surface and positioned in alignment with the aperture of said holder, and connecting means extending through the apertures of said holder and cutting blade to hold said cutting blade in the slot of said holder.

2. The invention of claim 1 and where the front surface of said cutting blade defines a groove extending from one of its side surfaces to the other of its side surfaces adjacent its top surface to form a sharpened edge along the intersection of the front surface with the top surface.

3. The invention of claim 2 and wherein said cutting blade is fabricated of a ferrous metal and said sharpened edge is heat hardened.

4. The invention of claim 1 and wherein the top surface of said cutting blade slopes away from its bottom surface from the rear surface toward the front surface.

5. A rotor assembly for a grinder of the type used to grind wood, scrap, or the like, comprising a rotor with alternate large and small diameter breaker rings, at least one breaker head positioned on and protruding from each breaker ring defining a substantially flat leading surface, a socket means defined in each breaker head and extending inwardly from said flat leading surface, a cutting tooth assembly positioned adjacent said flat leading surface and including a holder with a boss member extending into said socket, a cutting blade attached to said holder on the side thereof remote from said flat leading surface, said holder and said cutting blade defining aligned apertures, and a bolt extending through said apertures from said flat leading surface to lock said cutting blade to said holder.

* * * * *